May 3, 1955
R. A. RODEN
2,707,653
CLOSURES FOR OPENINGS IN TRUCK BODIES
Filed Nov. 27, 1953
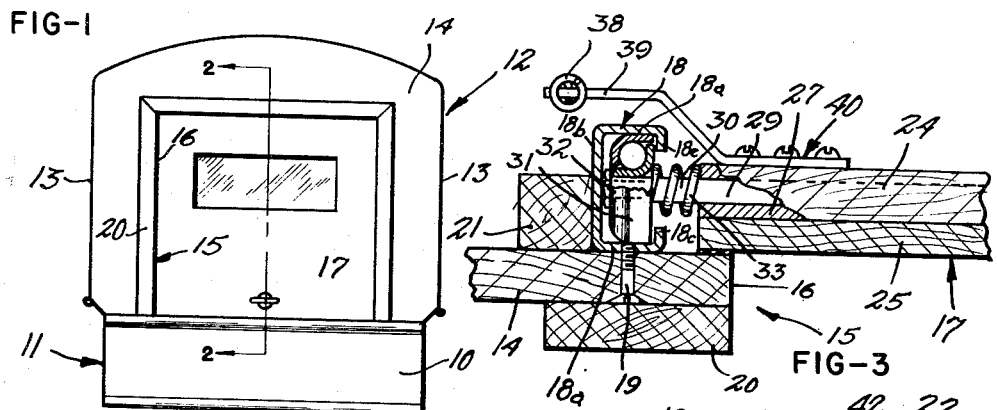
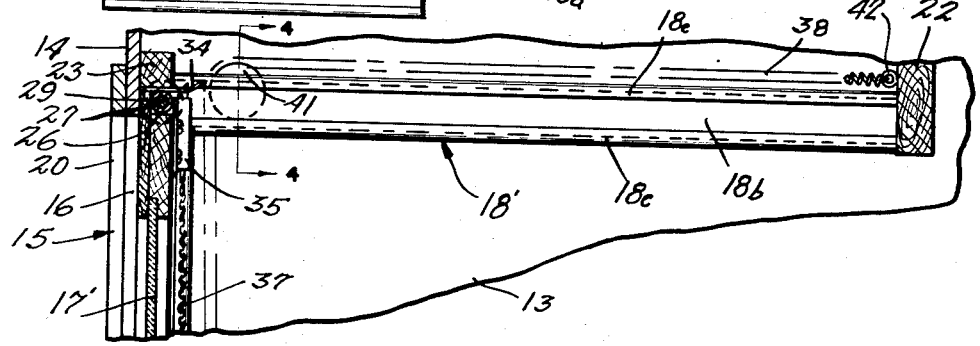
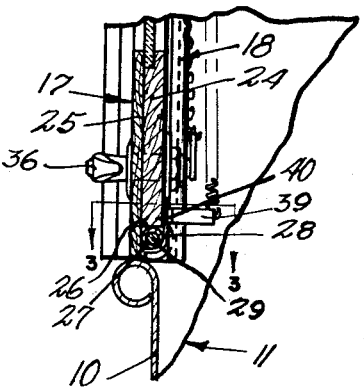
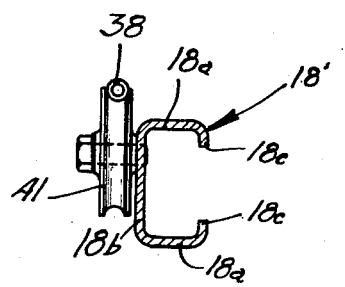
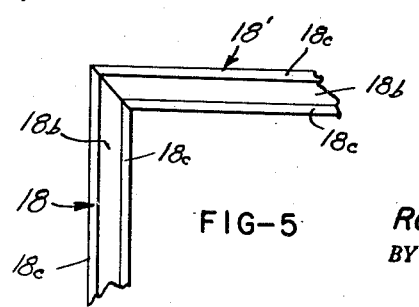
INVENTOR.
Ralph A. Roden
BY
Glenn L. Fish
ATTORNEY

United States Patent Office 2,707,653
Patented May 3, 1955

2,707,653

CLOSURES FOR OPENINGS IN TRUCK BODIES

Ralph A. Roden, Sandpoint, Idaho

Application November 27, 1953, Serial No. 394,736

2 Claims. (Cl. 296—106)

This invention relates to closures for openings, and it is one object of the invention to provide a closure for the access opening in a vehicle truck body which is so constructed and arranged as to avoid the possibility of the closure being stuck or bound against movement because of deviations in body shape.

Another object of the invention lies in the provision of a closure of the overhead type, which when moved to the open position is disposed in a substantially horizontal plane above the opening and completely out of the way.

Another object of the invention lies in the provision of a closure having resiliently mounted rollers cooperating with guide rails to direct the closure during closing and opening movements and to compensate for deviations in the body shape of the supporting frame.

Another object of the invention lies in the provision of a closure of the overhead type having a novel resilient closure balancing means arranged in such a way as to yieldably hold the door alternately in the open and closed positions.

Another object of the invention lies in the provision of an overhead door which is admirably suitable for use as a closure in the canopies of trucks where the body is susceptible to slight deviations from the truck movement.

These and other objects of the invention will become apparent during the course of the following description.

In the accompanying drawings, forming a part of this specification, and in which like numerals are employed to designate like parts:

Figure 1 is a view in elevation showing the rear end of a pickup truck having a canopy including the improved closure;

Figure 2 is a vertical cross section taken as at line 2—2 of Figure 1 and upon an enlarged scale;

Figure 3 is a horizontal fragmentary cross section, as at line 3—3 of Figure 2 and upon a still further enlarged scale;

Figure 4 is a fragmentary vertical cross section of a guide rail extension as at lines 4—4 of Figure 2; and Figure 5 is a side elevation showing the miter joint of a guide rail and its extension.

Referring now more particularly to the drawings, I have shown in Figure 1 the tail gate 10 of a conventional pickup truck body 11 and having a canopy indicated in general by the numeral 12 being constructed thereon. It will be understood that the canopy may be of any desired construction and materials, and need not be limited to one of wood, as shown. The canopy is provided with the customary side walls 13 and a rear wall 14 and a front wall (not shown).

An opening 15 is shown to be a rectangular cut away portion defined by the inner edges 16 of the end wall 14. I have shown the opening 15 as being in the rear wall 14, however, the opening may be in any wall desired. The closure, indicated in general by the numeral 17, is shown to be as greater dimensions than the opening 15 and its marginal edge portions overlay the inner marginal edge face portions when the closure 17 is in the closed position.

With this construction the closure cannot bind within the opening 15 and will permit a reasonable amount of side distortion of the canopy without binding the door or closure 17.

On the inside face of the rear wall 14, I provide vertical upwardly extending guide rails 18, one at each side of the opening 15 and spaced from said opening a suitable distance. For purposes of description and not for limitation, the guide rails are spaced approximately two and one-half inches from the inner edge 16 of the opening 15. As indicated in Figure 3, the guide rails 18 may be secured to the rear wall 14 by means of bolts 19 which extend through the rear wall 14 and thread into the guide rail 18. However, I do not wish to be limited to this manner of securing the guide rails as other means are contemplated in the exploitation of the invention. To cover the heads of the bolts 19, I provide a frame or plate 20 on the outside face of rear wall 14 at the marginal edge portion thereof and defining the opening 15 with its inner edges flush with the opening edge 16 of the wall 14. To strengthen the guide rails 18 against transverse pressure, I provide bearing blocks 21 secured to the rear wall inner face and bearing against the side web 18b of the guide rails 18.

It will be seen from the inspection of the drawing that the guide rails 18 and their horizontal extensions 18′ are substantially C-shaped in cross section and comprise opposed parallel flange portions 18a which are united along corresponding marginal edges by an intermediate web 18b extending at right angles to the flanges, and along their opposed marginal edges the flanges 18a are provided with opposed inturned spaced lips 18c also disposed at right angles to the flanges 18a and parallel with the web 18b. The upper ends of the guide rails 18 are mitered and guide rail extensions 18′ are secured thereto with the miter joints. At their forward ends the guide rail extensions 18′ are secured to a cross beam 22 having its ends anchored on the sidewalls 13. Any number of supports found desirable may be secured along the length of the guide rail extensions 18′.

Secured on the inner face of end wall 14 and spaced from the opening 15, I provide a bearing block 23 disposed horizontally across the upper margin of the opening 15. This provides a stop or arrestor to prevent upward movement of the upper edge of the closure 17 when in the closed position.

The closure 17 is shown to have a window 17′ therein and its details of construction are shown in Figures 2 and 3 wherein the closure is provided with a main plane section 24 and a veneer covering section 25 secured in face to face relation to the main section 24. The main or base section 24 is reduced in height from that of the veneer covering 25 and provides recesses indicated in general by the numeral 26 along the top and bottom edges of the closure 17. Secured in these recesses, I provide transversely extending sleeves 27 which terminate at the marginal side edges of the closure 17. The sleeves are secured in any suitable manner, such as by clamping brackets 28 and are thus prevented against movement relative to the closure 17. Rods 29 extend through the sleeves and have journal portions 30 projecting beyond the ends of the sleeves and therefore beyond the side edges of the closure 17. On the ends of the journal portions 30, I provide rollers 31 which may be of any suitable construction, and these rollers are secured on the journaled portions 30 by means of stub bolts 32 which are threaded into female sockets disposed axially in the journal portions of the rods 29.

Intermediate each roller 31 and the ends of the sleeves 27, I provide an expansion spring 33 which serve to resiliently mount the closure 17 for rectilinear movement over the rods 29 and permits the closure 17 to shift when the body deviates from its normal shape while the truck is traveling over uneven surfaces.

The bearing block 23 is provided with a catch 34 and at its upper edge at a point transversely with the catch 34 the closure 17 is provided on its inner face with a spring loaded latch 35 which is manually operated by means of an external handle 36. Preferably the handle is provided with a regular key and lock mechanism and a chain 37 unites the handle with the latch 35 permitting the door to be unlatched from the outside. The latch mechanism, as may be seen, is constructed to prevent the upper edge of the closure 17 from being moved forwardly accidentally.

The closure 17 is provided with a counterbalancing spring 38 which is secured at its lower end to a fastening bar 39 forming a part of a bracket 40. Journaled on the webs 18b of the guide rail extension 18', I provide pulleys 41 disposed in a vertical plane parallel with the plane of the webs 18b. The pulleys 41 are positioned in such a way that the flight of the spring 38 leading from the fastening arm 39 is upwardly at a rearward incline toward the closure 17 and thus it will be seen that the tension of spring 38 yieldably secures the closure 17 in closed position and prevent its removal therefrom. It also will be understood that when the top edge of the closure 17 is moved rearwardly beyond the center line of springs 38 the spring tension will exert to lift the lower edge of the door and raise the door to the open position. Therefore, I have provided a novel resilient door counterbalance which serves the dual purpose of maintaining the door in either the open or the closed position alternately.

The upper end of the spring 38 is secured at a point remote from the opening 15, here shown to be to the cross beam 22 at 42.

A securing bolt or other fastening means (not shown) may be employed to secure the closure in the raised position and preclude its accidental lowering by inertia.

Having thus described my invention with sufficient detail and clarity that one skilled in the art may construct and use the invention, I claim:

1. In combination with a vehicle body having side and rear walls, said rear wall having an opening therein; parallel guide rails secured to the inside face of said rear wall and extending upwardly at opposed sides of and spaced from said opening; horizontally disposed forwardly extending parallel guide rail extensions joining the upper ends of said guide rails with miter joints; each said rail being substantially C-shaped in cross section and comprising opposed parallel flange portions united along corresponding marginal edges by an intermediate right angle web portion and at their opposed marginal edges, having opposed spaced inturned right angle lips; a cross beam secured at its ends to said side walls and supporting the forward ends of said guide rail extensions; an enlarged closure for the opening having its marginal edge portions overlying the inside marginal edge portions of the rear wall; sleeves secured on the upper and lower edges of said closure and extending the full width thereof; rods in said sleeves and having journal portions projecting beyond the ends of said sleeves and adapted for rectilinear movement therein; rollers secured on the projecting journal portions of said rods; lower ones of said rollers being disposed in said vertical guide rails and upper ones of said rollers being disposed in said horizontal guide rails; expansion springs encircling a portion of the rod's projections and disposed between the ends of said sleeves and companion ones of said rollers; idler pulleys disposed in vertical planes parallel with the axis of said horizontal guide rails and journaled on the webs of said horizontal guide rails spaced from said miter joint; springs secured at their forward ends to said cross beam, trained about said pulleys and secured at their other ends to said closure adjacent its lower edge and spaced forwardly from its inner face by means of brackets carried by said closure; and a latch on the closure for releasably securing the upper edge portion of said closure to said rear wall when in the closed position.

2. In combination with a vehicle body having side and rear walls, said rear wall having an opening therein; parallel guide rails extending upwardly at opposed sides of and spaced from said opening; horizontally disposed forwardly extending parallel guide rail extensions joining the upper ends of said guide rails with miter joints; each said rail being substantially C-shaped in cross section and comprising opposed parallel flange portions united along corresponding marginal edges by an intermediate right angle web portion and at their opposed marginal edges having opposed spaced inturned right angle lips; means supporting the forward ends of said guide rail extensions; an enlarged closure for the opening having its marginal edge portions overlying the inside marginal edge portions of the rear wall when in the closed position; rods carried on the upper and lower edges of said closure and having journal portions projecting beyond the side edges thereof and adapted for rectilinear movement; rollers secured on the projecting journal portions of said rods; said rollers being disposed for movement within said guide rails; expansion springs encircling a portion of said journals and disposed between the side edges of said closure and said rollers; idler pulleys disposed in vertical planes parallel with the axes of said horizontal guide rails and journaled on the webs of said horizontal guide rails spaced from said miter joint; springs secured at a point removed from said pulleys, trained about said pulleys and secured at their other ends to said closure adjacent its lower edge and spaced forwardly from its inner face by means of brackets carried by said closure; each said pulley and its companion bracket being so related that when the closure is in the closed position a portion of each of said last named springs extends downwardly at a forward angle from the pulley to the bracket; and a manually operable latch for releasably securing the closure against movement when in the closed position.

References Cited in the file of this patent

UNITED STATES PATENTS

| Number | Name | Date |
|---|---|---|
| 494,142 | Hendershott | Mar. 28, 1893 |
| 1,427,195 | Daly | Aug. 29, 1922 |
| 1,722,250 | McKee | July 23, 1929 |
| 1,757,955 | Dautrick | May 13, 1930 |
| 2,045,060 | Wheatley | June 23, 1936 |
| 2,155,357 | Creteur | Apr. 18, 1939 |
| 2,258,971 | Carlson | Oct. 14, 1941 |